United States Patent
Endou et al.

(10) Patent No.: US 10,152,496 B2
(45) Date of Patent: Dec. 11, 2018

(54) USER INTERFACE DEVICE, SEARCH METHOD, AND PROGRAM

(71) Applicant: NTT DOCOMO, INC., Tokyo (JP)

(72) Inventors: Satoshi Endou, Tokyo (JP); Fumie Miyamoto, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 578 days.

(21) Appl. No.: 14/412,255

(22) PCT Filed: Aug. 7, 2013

(86) PCT No.: PCT/JP2013/071376
§ 371 (c)(1),
(2) Date: Dec. 31, 2014

(87) PCT Pub. No.: WO2014/041929
PCT Pub. Date: Mar. 20, 2014

(65) Prior Publication Data
US 2015/0178323 A1    Jun. 25, 2015

(30) Foreign Application Priority Data

Sep. 13, 2012 (JP) .................................. 2012-201318

(51) Int. Cl.
*G06F 17/30* (2006.01)
*G06F 3/0486* (2013.01)
*G06F 3/0488* (2013.01)

(52) U.S. Cl.
CPC ...... *G06F 17/30277* (2013.01); *G06F 3/0486* (2013.01); *G06F 3/04883* (2013.01);
(Continued)

(58) Field of Classification Search
CPC .......... G06F 3/04842; G06F 17/30864; G06F 3/0481; G06F 17/30867; G06F 17/30554;
(Continued)

(56) References Cited

U.S. PATENT DOCUMENTS

2011/0022982 A1* 1/2011 Takaoka ............... G06F 3/04817
715/810
2013/0007061 A1* 1/2013 Luomala ........... G06F 17/30103
707/776
(Continued)

FOREIGN PATENT DOCUMENTS

JP      10-289251 A     10/1998
JP      2004-192355 A   7/2004
(Continued)

OTHER PUBLICATIONS

PCT International Search Report issued in International Application No. PCT/JP2013/071376, dated Sep. 17, 2013, pp. 1-2.
(Continued)

*Primary Examiner* — Yuk Ting Choi
(74) *Attorney, Agent, or Firm* — MKG, LLC

(57) ABSTRACT

Setting of a search condition is facilitated. A communication terminal initially displays a plurality of search panels including a search panel P1, which is an image corresponding to a search target in a certain category. Thereafter, upon a user selecting one of the search panel (here, P1), the communication terminal displays search panels P11 to P16, which are images corresponding to search targets in sub-categories of the category of the search panel P1. The user can change the search condition by moving one of the search panels P11 to P16.

12 Claims, 4 Drawing Sheets

(52) U.S. Cl.
CPC .. *G06F 17/30265* (2013.01); *G06F 17/30973* (2013.01); *G06F 2203/04803* (2013.01)

(58) Field of Classification Search
CPC ........... G06F 17/30964; G06F 3/04817; G06F 17/30572
See application file for complete search history.

(56) References Cited

U.S. PATENT DOCUMENTS

| 2013/0167059 | A1* | 6/2013 | Legris | G06F 3/0482 715/769 |
| 2015/0213095 | A1* | 7/2015 | Endou | G06F 3/0486 707/725 |
| 2015/0234926 | A1* | 8/2015 | Endou | G06F 17/30867 707/725 |

FOREIGN PATENT DOCUMENTS

| JP | 2008250620 A | 10/2008 |
| JP | 2009-134738 A | 6/2009 |
| JP | 2010-134664 A | 6/2010 |
| JP | 2011-028534 A | 2/2011 |
| JP | 2011-059194 A | 3/2011 |
| JP | 2012-014293 A | 1/2012 |

OTHER PUBLICATIONS

Japanese Office Action issued in corresponding JP Application No. 2014-535449, dated Jun. 2, 2015, pp. 1-4.
Extended European Search Report issued in corresponding European Application No. 13837784.1 dated Jun. 3, 2016, pp. 1-6.
Office Action issued in corresponding European Patent Application No. 13837784.1, dated Apr. 11, 2018, pp. 1-6.
Summons To Attend Oral Proceedings issued by the European Patent Office for corresponding European Patent Application No. 13837784.1 dated Aug. 7, 2018, 9 pages.
Calpe et al., AD7879 Controller Enables Gesture Recognition on Resistive Touch Screens, Analog Dialogue 45-06, Jun. 2011, http://www.analog.com/media/en/analog-dialogue/volume-45/number-2/articles/gesture-recognition-on-resistive-touch-screens.pdf, 5 pages.
Results of Consultation issued by the European Patent Office for corresponding European Patent Application No. 13837784.1 dated Sep. 19, 2018, 3 pages.

* cited by examiner

USER INTERFACE DEVICE, SEARCH METHOD, AND PROGRAM

TECHNICAL FIELD

The present invention relates to a UI (User Interface).

BACKGROUND ART

UIs for electronic devices such as smartphones are required to be easy to use. For example, there is a constant demand for models that can be easily operated even by those who are not used to performing operation, such as the elderlies, and models having not only a normal mode but also a mode in which operations are easy. JP 2011-059194A Patent Document 1 discloses a technique for determining attributes of a user, such as his/her age and gender, based on characteristics of the user's face, and displaying an operation screen in accordance with the user attributes.

Incidentally, regarding an information search, there is a problem in that those who are not used to searching cannot set an appropriate search condition, and consequently has a difficulty in reaching desired information. For example, although a so-called AND search and OR search are often implemented in existing search engines, in some cases it is difficult for those who are not used to searching to set many search words, or they cannot even conceive appropriate search words, in the first place.

For this reason, it is an object of the present invention to facilitate setting of a search condition.

SUMMARY

The present invention provides a user interface device including: a display control unit that displays, in a display area, a first image corresponding to a first search target and a plurality of second images corresponding respectively to a plurality of second search targets; a detection unit that detects an operation of changing a relative positional relationship between the first image and the plurality of second images; and a generation unit that changes a search condition in accordance with the operation detected by the detection unit and generates a query for searching for the first search target and at least one of the plurality of second search targets.

The generation unit may generate a query in which a weight of the second search target corresponding to at least one of the plurality of second images is changed in accordance with the positional relationship.

The generation unit may generate a query including, as the search condition, a second search target corresponding to a second image that has approached the first image as a result of the operation, from among the plurality of second images, or a query excluding, from the search condition, a second search target corresponding to a second image that has moved away from the first image as a result of the operation, from among the plurality of second images.

The display control unit may display a plurality of first images corresponding respectively to a plurality of first search targets that are different from each other, and if a predetermined operation of selecting a first image from the first images is detected by the detection unit, more than one second images corresponding to the selected first image, from among the plurality of second images, may be displayed.

The plurality of second search targets may represent a subordinate concept of the first search target.

An acquisition unit that acquires a search result in response to the query generated by the generation unit may further be included, and the display control unit, before displaying content corresponding to the search result, may display a quantity of the content in the display area.

The display control unit may change a display mode of at least one of the plurality of second images, in accordance with a change in the positional relationship.

The present invention also provides a search method including the steps of: displaying, in a display area, a first image corresponding to a first search target and a plurality of second images corresponding respectively to a plurality of second search targets; detecting an operation of changing a relative positional relationship between the first image and the plurality of second images; and changing a search condition in accordance with the detected operation and generating a query for searching for the first search target and at least one of the plurality of second search targets.

The present invention also provides a program for causing a computer to execute the steps of: displaying, in a display area, a first image corresponding to a first search target and a plurality of second images corresponding respectively to a plurality of second search targets; detecting an operation of changing a relative positional relationship between the first image and the plurality of second images; and changing a search condition in accordance with the detected operation and generating a query for searching for the first search target and at least one of the plurality of second search targets.

According to the present invention, setting of a search condition can be facilitated.

DETAILED DESCRIPTION

Embodiments

Figure 1:
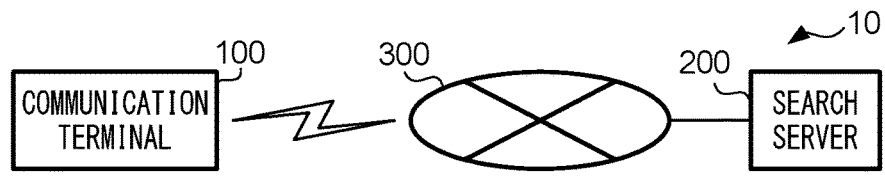
FIG. 1 is a block diagram showing an overall configuration of an information search system.

FIG. 1 is a block diagram showing an overall configuration of an information search system 10, which is an embodiment of the present invention. The information search system 10 includes a communication terminal 100 and a search server 200, and has a configuration in which the communication terminal 100 and the search server 200 are connected to each other by a network 300, such as a mobile communication network or the Internet.

The communication terminal 100 is an electronic device used by a user for an information search or the like. Here, the communication terminal 100 is a mobile communication terminal such as a smartphone or a tablet terminal, and is configured to enable operations on a touch screen, as described later. The search server 200 is a server device that executes a content search in accordance with a request (query) from the communication terminal 100 and returns a search result. In the present embodiment, the "content" refers to a Web page. That is to say, the search server 200 provides the communication terminal 100 with a list of URLs (Uniform Resource Locators) of Web pages that match a search condition as the search result.

Figure 2:
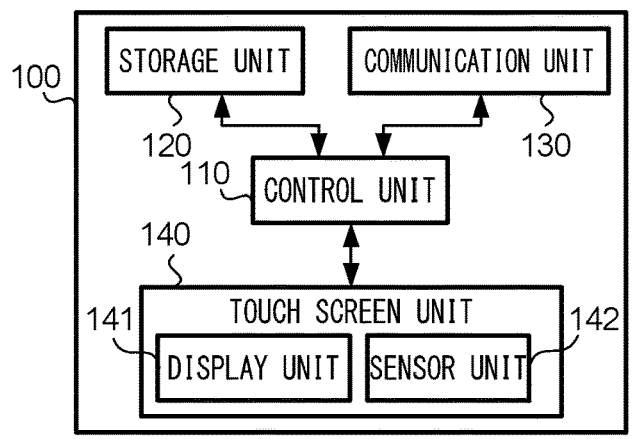
FIG. 2 is a block diagram showing a hardware configuration of a communication terminal.

FIG. 2 is a block diagram showing a hardware configuration of the communication terminal 100. The communication terminal 100 includes a control unit 110, a storage unit 120, a communication unit 130, and a touch screen unit 140. Note that although not shown here, the communication terminal 100 may include a microphone, a speaker, an operation means other than the touch screen unit 140 (such as a so-called operation button), or the like.

The control unit 110 is a means for controlling an operation of each unit in the communication terminal 100. The control unit 110 includes a memory and a processor such as a CPU (Central Processing Unit), and performs control by executing a predetermined program. The control unit 110 also realizes a user interface device according to the present invention in accordance with a user operation accepted by the touch screen unit 140.

The storage unit 120 is a means for storing data. The storage unit 120 includes a recording medium such as a hard disk or a flash memory, for example, and stores data to be used by the control unit 110 for performing control. For example, the storage unit 120 can store a program to be executed by the control unit 110 and image data for displaying an image on the touch screen unit 140.

The communication unit 130 is a means for transmitting and receiving data via the network 300. The communication unit 130 includes an antenna and a modem that conforms to the communication method of the network 300, and executes processing necessary for data communication, such as data modulation and demodulation.

The touch screen unit 140 is a means for displaying an image and accepting the user operation. More specifically, the touch screen unit 140 includes a display unit 141 and a sensor unit 142. The display unit 141 includes a display area constituted by liquid crystal elements or organic EL (electroluminescence) elements, and a drive circuit for driving the display area, and displays an image corresponding to image data. The sensor unit 142 includes a sensor provided so as to be overlaid on the display area of the display unit 141, and supplies coordinate information to the control unit 110 in accordance with the user operation. In the present embodiment, the "user operation" refers to a finger or the like touching an arbitrary position in the display area. The coordinate information is described as coordinates in a two-dimensional orthogonal coordinate system with a predetermined position in the display area being an origin.

Figure 3:
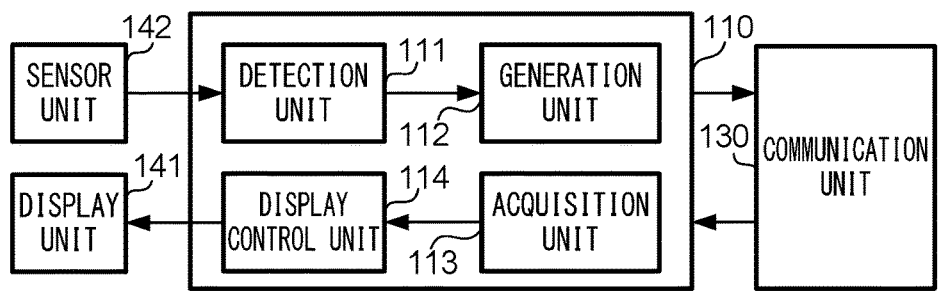
FIG. 3 is a block diagram showing a functional configuration related to a search function of the communication terminal.

FIG. 3 is a block diagram showing a functional configuration related to a search function of the communication terminal 100. The control unit 110 in the communication terminal 100 realizes functions corresponding to the detection unit 111, the generation unit 112, the acquisition unit 113, and the display control unit 114, by executing a predetermined program. These functions correspond to functions of the user interface device according to the present invention.

The detection unit 111 is a means for detecting the user operation. The detection unit 111 detects what kind of operation the user operation is, based on the coordinate information supplied from the sensor unit 142 and the image that is displayed in the display area at that time. The detection unit 111 can detect operations such as "tapping", which is an instantaneous touch on a single point in the display area, "double tapping", which is quick repetition of a tapping operation twice, "dragging", which is a touch on a single point in the display area, followed by a continuous movement of the touching position while maintaining a touching state, and the like. Furthermore, the detection unit 111 can detect a duration time of an operation, and can also detect an operation of continuously touching a single point in the display area for a predetermined time or longer, or a so-called "long-pressing".

The generation unit 112 is a means for executing processing in accordance with the operation detected by the detection unit 111. In the present embodiment, a main function of the generation unit 112 is a function of generating a query. Here, the "query" refers to information (character string) for designating a search condition and giving the search server 200 a request for a search using the search condition, and includes at least a search word indicating a search target. The generation unit 112 can generate the query in accordance with the operation detected by the detection unit 111. The query generated by the generation unit 112 is transmitted to the search server 200 via the communication unit 130.

The acquisition unit 113 is a means for acquiring data. For example, the acquisition unit 113 acquires list data indicating a search result from the search server 200 via the communication unit 130 if the query is transmitted from the communication terminal 100. Note that the acquisition unit 113 can acquire not only the list data but also other data necessary for a search and display of information.

The display control unit 114 is a means for controlling display by the display unit 141. The display control unit 114 causes the display unit 141 to display characters or an image in accordance with the data acquired by the acquisition unit 113. For example, the display control unit 114 can display a search panel, which will be described later, and display a search result list based on the list data.

The configuration of the information search system 10 is as described above. With this configuration, the user of the communication terminal 100 can execute a content search using the communication terminal 100, as necessary. The feature of the search in the present embodiment lies in that the search can be executed by a user selecting an image displayed in the display area of the display unit 141, without inputting characters (text).

Figure 4:
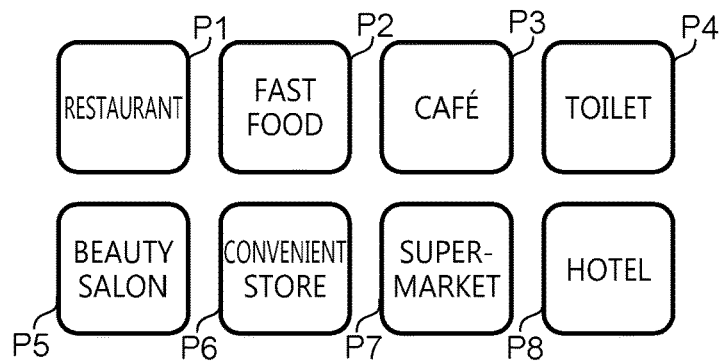
FIG. 4 shows an exemplary search screen.

FIG. 4 shows an exemplary search screen in the present embodiment. The search screen shown in FIG. 4 displays a plurality of search panels P1 to P8. The search panels P1 to P8 are icons (images) each corresponding to a predetermined search target. For example, the search panel P1 corresponds to a search target "restaurant". When searching for a restaurant, the user need only select the search panel P1. The operation for selecting the search panel is an operation of touching the search panel, for example.

The user can change the search condition by performing a predetermined operation. In the present embodiment, the search panels (i.e., search target) have a hierarchical structure. Each search panel indicates a search target belonging to a certain category (or genre), and can be associated with a subordinate category (hereinafter referred to as a "sub-category") belonging to the category indicated by the search panel.

Figures 5, 6:
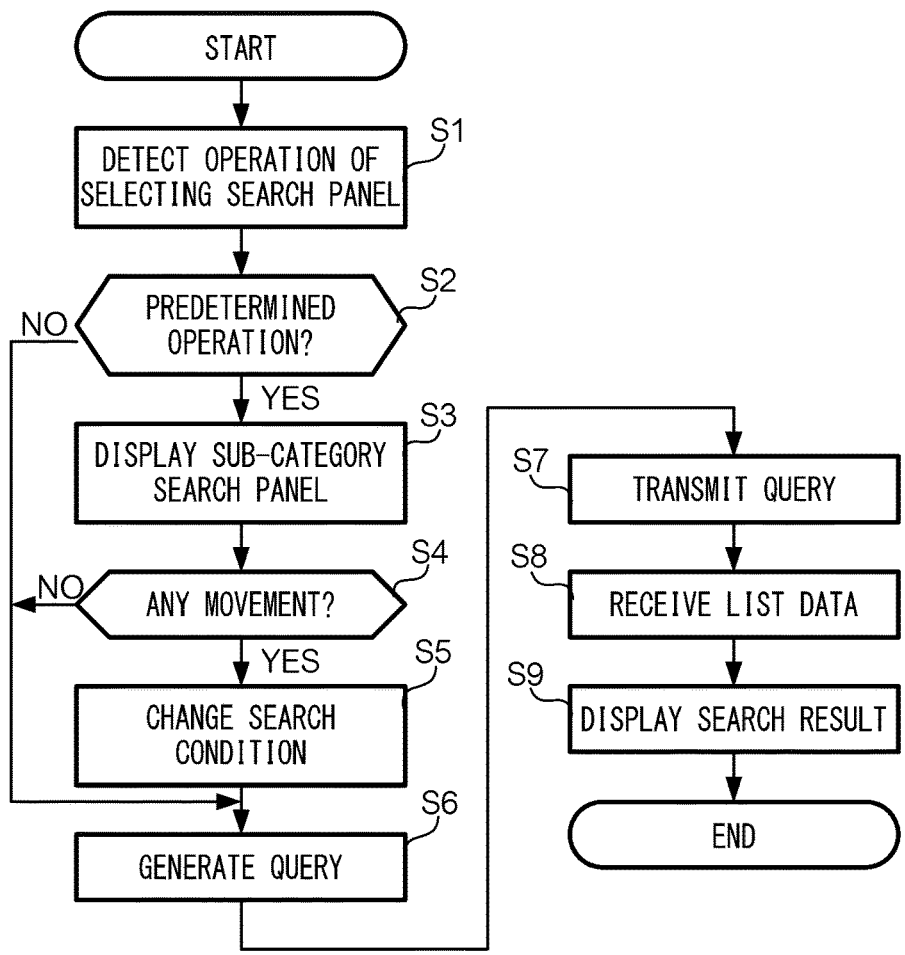
FIG. 5 shows an exemplary hierarchical structure of a search target.
FIG. 6 is a flowchart showing search processing.

FIG. 5 shows an exemplary hierarchical structure of the search target. Here, the category "restaurant" corresponding to the search panel P1 in FIG. 4 and the sub-categories thereof are shown. The sub-categories associated with the category "restaurant" are "Japanese", "Chinese", "Italian", "non-smoking", "open on Saturday and Sunday", and "reservable". Here, the sub-category "Japanese" indicates restaurants that serve Japanese food, and corresponds to a subordinate concept with respect to the superordinate concept "restaurant" in which the genre of food to be served is not considered.

In the present embodiment, the user can perform a search by designating only a superordinate category such as "restaurant", and can also perform a search by further designating these sub-categories. For example, if the user sets "restaurant" as the search target, content corresponding thereto is displayed as the search result, whereas if the user sets "restaurant" and "non-smoking" as the search target, the search result that is obtained in the case of setting only "restaurant" as the search target and also matches the condition of "non-smoking" is selectively displayed. That is to say, the latter search is a so-called filtering search.

Note that the number of search panels and the corresponding search targets are only examples, and are not limited to those shown in the drawing. The search target may be different for each user. For example, different search targets may be prepared depending on the gender, age, location, or the like of users. Furthermore, the communication terminal 100 may be configured such that the search panels to be displayed and the arrangement thereof can be customized in accordance with the user operation.

The characters to be displayed in the search panels and actual search words do not necessarily have to match each other. For example, the query generated when the search panel P3 on which "café" is written is selected may include "coffee shop", rather than "café", or may include both of them as search words in an OR search. Alternatively, it is also possible to display not characters but an image in the search panel.

The search in the present embodiment may be a search for content on the entire Internet, or may be a search for only content of a specific Web site. Alternatively, the search in the present embodiment may be a so-called local search, which is a search for content associated with the surroundings of the location of a terminal that performs a search, using a positioning means such as a GPS (Global Positioning System). For example, if the aim is to search for an eating place, an amusement facility, an accommodation, or the like, the local search is needed in some cases.

FIG. 6 is a flowchart showing search processing in the present embodiment. In this search processing, the control unit 110 in the communication terminal 100, upon detecting an operation of selecting one of the search panels (step S1), then determines whether or not the operation performed on the search panel is a predetermined operation (step S2). Here, the "predetermined operation" refers to an operation that is different from the operation for selecting the search panel in the case of not narrowing down the search condition. For example, if the operation for selecting the search panel is a tapping operation, the predetermined operation here may be a double-tapping operation or a long-pressing operation.

The control unit 110, upon detecting the predetermined operation, controls the display unit 141 so as to display the search panels corresponding to the sub-categories of the category corresponding to the search panel selected in step S1 (step S3). At this time, the control unit 110 may be configured not to display the search panels other than the search panel selected in step S1, among the search panels that have been displayed until then.

Figure 7:
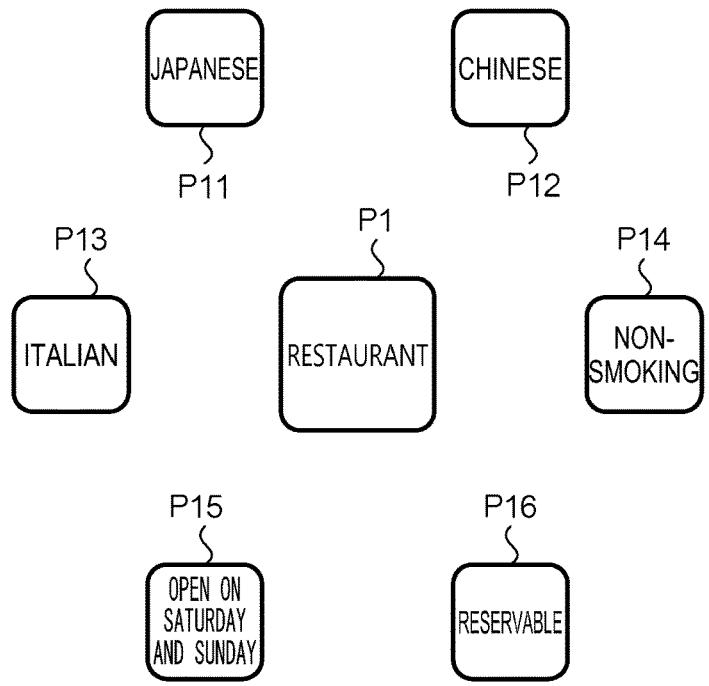
FIG. 7 shows exemplary screen transition of the search screen.

FIG. 7 shows exemplary screen transition of the search screen. The example in FIG. 7 shows the case where the user performs the predetermined operation on the search panel P1 indicating "restaurant" and causes the sub-category search panels P11, P12, P13, P14, P15, and P16 that correspond to the search panel P1 to be displayed. Here, the search panels P11 to P16 are arranged so as to surround the search panel P1 and to be at nearly the same distance from the search panel P1

The control unit 110 determines, in this state, whether or not at least one of the sub-category search panels has been moved (step S4). A movement of a search panel is realized by a dragging operation performed on the search panel, for example. If at least one of the sub-category search panels is moved, the control unit 110 changes the search condition (step S5). Thereafter, the control unit 110, upon detecting an operation for starting a search, generates the query in accordance with the changed search condition (step S6). The timing of execution of processing in step S6 may be, for example, the timing of the user separating, from the search panel, his/her finger that has been touching the search panel, or may be the timing of detection of the predetermined operation (an operation of pressing a so-called search button).

On the other hand, if the predetermined operation is not detected in step S2, or if no sub-category search panel is moved in step S4, the control unit 110 generates the query without changing the search condition (step S6). That is to say, in this case, the control unit 110 generates the same query as that generated in the case where no sub-category search panel is selected and only the search panel in the superordinate category is selected.

After thus generating the query, the control unit 110 transmits the query to the search server 200 via the communication unit 130 (step S7). The search server 200, upon receiving the query, generates the list data in response to the received query, and transmits the generated list data to the communication terminal 100. The control unit 110 receives the list data via the communication unit 130 (step S8), and displays the search result on the display unit 141 in accordance with the list data (step S9).

Figure 8:
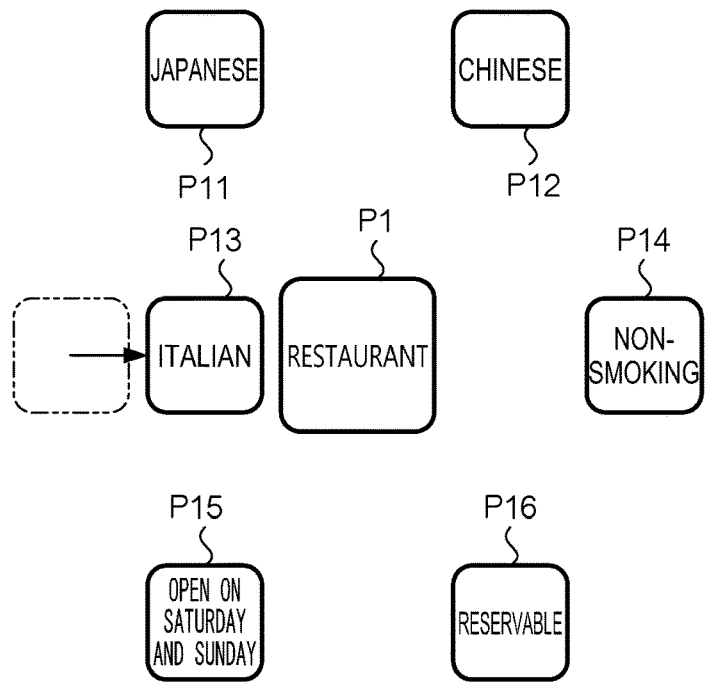
FIG. 8 shows exemplary screen transition in the case where a search condition is changed.
Figure 9:
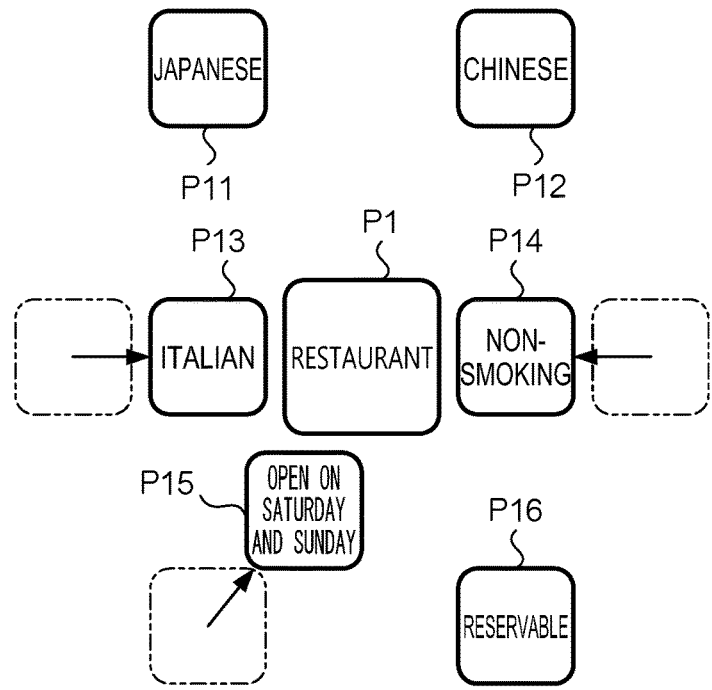
FIG. 9 shows exemplary screen transition in the case where a search condition is changed.

FIG. 8 shows exemplary screen transition in the case where the search condition is changed. The example in FIG. 8 shows the case where, in the example in FIG. 7, the user has moved the search panel P13 corresponding to the sub-category "Italian" and brought the search panel P13 close to the search panel P1. Note that the arrow shown in FIG. 8 indicates the moving direction of the search panel P13. As a result, the relative positional relationship between the search panel P1 and the search panels P11 to P16 changes. Here, the distance between the search panel P1 and the search panel P13 is shorter than that before the movement is made. At this time, the communication terminal 100 generates the query including "Italian" and "restaurant" as the search condition. That is to say, the communication terminal 100 generates the query so as to narrow down the search result as compared with the case where the user does not designate the sub-category Note that the user may move a plurality of sub-category search panels. For example, in the example in FIG. 9, the search panel P13 corresponding to "Italian" as well as the search panel P14 corresponding to "non-smoking" and the search panel P15 corresponding to "open on Saturday and Sunday" in the example in FIG. 8 have been brought close to the search panel P1. In this case, the communication terminal 100 generates the query including "Italian", "non-smoking", "open on Saturday and Sunday", and "restaurant" as the search condition. The user need only perform this operation if he/she wants to search for a non-smoking Italian restaurant that is open even on Saturday and Sunday.

Figure 10:
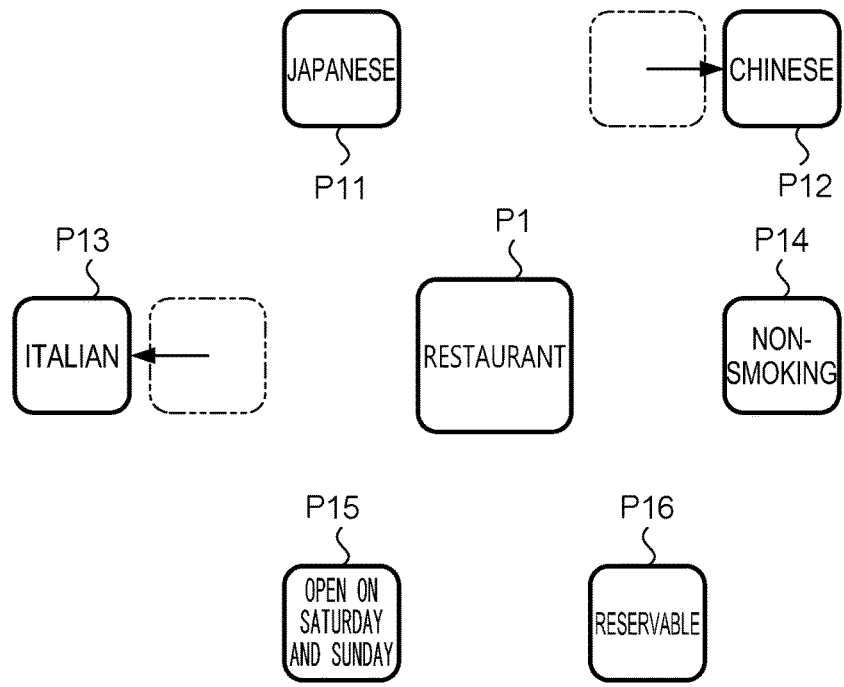
FIG. 10 shows exemplary screen transition in the case where a search condition is changed.

The communication terminal 100 can also exclude a part of the sub-categories from the search condition. In order to generate the query that does not include a part of the sub-category search targets in the search condition, for example, a sub-category search panel need only be moved from its original position away from the search panel P1, as shown in FIG. 10. If the communication terminal 100 detects that a sub-category search panel has moved away from its original position, the communication terminal 100 generates the query excluding the search target corresponding to this search panel from the search condition. For example, in the example in FIG. 10, the communication terminal 100 generates the query that includes "restaurant" as the search condition and excludes "Chinese" and "Italian" from the search condition.

As described above, according to the present embodiment, the search condition can be changed by the operation of changing the relative positional relationship between two kinds of images (search panels) corresponding respectively to a first image and a second image. Thus, the user can easily set the search condition without inputting characters or thinking of a search target by himself/herself Modification The present invention is not limited to the mode in the above-described embodiment, and can also be carried out in other modes. Examples of other modes of the present invention will be described below. Note that these modifications can also be combined appropriately, as necessary.

(1) The search in the above-described embodiment is a so-called AND search (a logical search for obtaining a search result using, as a search target, a logical product of multiple search targets). However, the present invention is applicable to both an AND search and an OR search (a logical search for obtaining a search result using, as a search target, a logical sum of multiple search targets). Furthermore, the present invention may be configured to selectively execute one of an AND search and an OR search in accordance with the user operation. For example, with the configuration in the above-described embodiment, the communication terminal 100 may execute an AND search if one of the search panels P11 to P16 has approached the search panel P1 (i.e., if the distance between the search panel P1 and one of the search panels P11 to P16 has been shortened), and the communication terminal 100 may execute an OR search if one of the search panels P11 to P16 has moved away from the search panel P1 (i.e., the distance between the search panel P1 and one of the search panels P11 to P16 has been widened).

(2) In the present invention, the operation for changing the search condition is not limited to the operation of changing the distance between the first image and the second image (the distance between the search panels). The operation for changing the search condition may also be an operation of rotating the second image around the first image clockwise or counterclockwise, without changing the distance between the first image and the second image. The relative positional relationship between the first image and the second image can also be changed in this manner. Furthermore, in this case, an AND search may be executed if the second image is rotated clockwise, and an OR search may be executed if the second image is rotated counterclockwise, for example.

(3) The search in the present invention may be a so-called weighted search. Here, the "weighted search" refers to a search performed while setting different weights (importance, degree of importance) for a search word and another search word in the case where the query includes a plurality of search words serving as the search targets. In the present invention, for example, weighting can be performed in accordance with the distance between the first image and the second image. For example, the communication terminal 100 may set a large weight for a search target corresponding to the second image if the second image has approached the first image, and may set a small weight for the search target corresponding to the second image if the second image has moved away from the first image.

(4) The communication terminal 100 may use different display modes for the search panels in accordance with the user operation. For example, the communication terminal 100 may change the color of a search panel, whose relative positional relationship has been changed or may cause the search panel to blink, thus applying, to the search panel, the display mode that is different from that of the other search panels so as to facilitate distinction from the other search panels. At this time, the communication terminal 100 may perform so-called gradation display with which the color of a moving search panel among the search panels P11 to P16 (second image) is gradually changed in accordance with the distance from the search panel P1 (first image).

(5) In the case where the search condition is changed, the communication terminal 100 may cause the display unit 141 to display the quantity of content before displaying the list data (before displaying the search result). The quantity mentioned here may be the number of content pieces that match the search condition designated by the user, or may be the approximate number thereof. The communication terminal 100 may also display the quantity of the content that matches the search condition by means of the display mode of the first image or the second image (search panel). For example, the communication terminal 100 may change the color of the search panels in accordance with whether the number of content pieces that match the search condition is large or small.

(6) The search in the present invention is not limited to a search performed via a server device. The search in the present invention is also applicable to a search for a local file (a file stored in a device that performs the search), such as a so-called desktop search. That is to say, the present invention is not limited to a search in which the query is generated and output to the outside, and may also include a search executed by a device in response to the query generated thereby.

(7) The content in the present invention is not limited to a Web page. The content in the present invention may be a document other than a Web page, or may be a Web page on which digital content (or a link thereof) such as music, a movie, or a game is embedded. Alternatively, the content in the present invention may be a Web page on which reviews or evaluation (so-called word-of-mouth information) of such digital content is described. That is to say, the present invention may be for searching for this kind of digital content.

(8) The operation means in the present invention is not limited to a touch screen. For example, the operation means in the present invention may be for projecting an image (search panel) corresponding to a search target on a desk or a wall surface, and detecting the position of a finger by means of an infrared ray or the like. The operation in the present invention does not necessarily have to be performed by a finger, and may be performed using a stylus (which is also called a stylus pen or a touch pen). Here, a finger and an alternative pointing tool are referred to collectively as a "pointer".

The operation in the present invention is not limited to the operation of causing the pointer to touch the display area. For example, a capacitance touch screen can detect not only a touch by a finger but also a state where a finger has approached the touch screen (without touching). The operation means in the present invention may also be for detecting an operation based on such a state where a finger has approached.

(9) The user interface device in the present invention is also applicable to various electronic devices other than a smartphone and a tablet terminal. For example, the present invention is also applicable to a user interface device such as a portable game device, a portable music player, an electronic book reader, an electronic dictionary, and a personal computer.

Furthermore, the present invention may be understood not only as the user interface device but also as an electronic device including this user interface device, an information search system including this electronic device and a server device, an information search method, and a program for causing a computer to function as the user interface device in the present invention. The program according to the present invention can be provided in the mode in which the program is stored in a recording medium such as an optical disk, or in the mode in which a computer is caused to download the program via a network such as the Internet and install the downloaded program so as to be available.

What is claimed is:

1. A user interface device comprising:
a display control unit that displays, in a display area, a plurality of first images including a plurality of first characters indicating a plurality of first search targets, and in response to a user operation of selecting by a user a first image from the plurality of first images, displays, in the display area, a plurality of second images including a plurality of second characters indicating a plurality of second search targets such that the plurality of second images are arranged so as to surround the selected first image each at a same distance from the selected first image, the plurality of first characters or the plurality of second characters varying depending on an attribute of the user;
a detection unit that detects an operation of changing a relative positional relationship between the selected first image and at least one second image selected from the plurality of second images;
a generation unit that changes a search condition in accordance with the operation detected by the detection unit and generates a query in which either an AND search or an OR search is employed according to a change in the relative positional relationship, the query being used for searching for a web page including a search word corresponding to a first character included in the selected first image and at least one of the plurality of second search characters; and
a transmission unit that transmits the generated query to a search server;
wherein:

the display control unit changes a display mode of the at least one second image of the plurality of second images, in accordance with a change in the positional relationship; and
the attribute of the user is at least one of a gender of the user and an age of the user.

2. The user interface device according to claim 1, wherein the generation unit generates a query in which a weight of at least one of the plurality of second search targets is changed in accordance with the positional relationship.

3. The user interface device according to claim 2, wherein the generation unit generates a query including, as the search condition, a second search target corresponding to the at least one second image that has approached the selected first image as a result of the operation, or a query excluding, from the search condition, a second search target corresponding to the at least one second image that has moved away from the selected first image as a result of the operation, from among the plurality of second images.

4. The user interface device according to claim 1, wherein the display control unit displays a plurality of first images corresponding respectively to a plurality of first search targets that are different from each other, and
if a predetermined operation of selecting a first image from the first images is detected by the detection unit, more than one second image corresponding to the selected first image, from among the plurality of second images, are displayed.

5. The user interface device according to claim 1, wherein the plurality of second search targets represent a subordinate concept of the first search target.

6. The user interface device according to claim 1, further comprising an acquisition unit that acquires a search result in response to the query generated by the generation unit,
wherein the display control unit, before displaying content corresponding to the search result, displays a quantity of the content in the display area.

7. A search method comprising the steps of:
displaying, in a display area of a computer, a plurality of first images including a plurality of first characters indicating a plurality of first search targets, and in response to a user operation of selecting by a user a first image from the plurality of first images, displays, in the display area, a plurality of second images including a plurality of second characters indicating a plurality of second search targets such that the plurality of second images are arranged so as to surround the selected first image each at a same distance from the selected first image, the plurality of first characters or the plurality of second characters varying depending on an attribute of the user;
detecting an operation of changing a relative positional relationship between the selected first image and at least one second image selected from the plurality of second images;
changing a search condition in accordance with the operation detected by the detection unit and generating a query in which either an AND search or an OR search is employed according to a change in the relative positional relationship, the query being used for searching a web page including a search word corresponding to a first character included in the selected first image and at least one of the plurality of second search characters;

transmitting the generated query to a search server; and changing a display mode of the at least one second image of the plurality of second images, in accordance with a change in the relative positional relationship;

wherein the attribute of the user is at least one of a gender of the user and an age of the user.

8. A non-transitory computer readable medium storing computer-readable instructions that when executed, control a computer to execute the steps of:

displaying, in a display area, a plurality of first images including a plurality of first characters indicating a plurality of first search targets, and in response to a user operation of selecting by a user a first image from the plurality of first images, displaying, in the display area, a plurality of second images including a plurality of second characters indicating a plurality of second search targets such that the plurality of second images are arranged so as to surround the selected first image each at a same distance from the selected first image, the plurality of first characters or the plurality of second characters varying depending on an attribute of the user;

detecting an operation of changing a relative positional relationship between the selected first image and at least one second image selected from the plurality of second images;

changing a search condition in accordance with the operation detected by the detection unit and generating a query in which either an AND search or an OR search is employed according to a change in the relative positional relationship, the query being used for searching a web page including a search word corresponding to a first character included in the selected first image and at least one of the plurality of second search characters;

transmitting the generated query to a search server; and changing a display mode of the at least one second image of the plurality of second images, in accordance with a change in the relative positional relationship;

wherein the attribute of the user is at least one of a gender of the user and an age of the user.

9. The user interface device according to claim 1, wherein the generation unit determines the AND search or the OR search according to a distance between the selected first image and the selected at least one second image.

10. The user interface according to claim 9, wherein the generation unit generates the query in which the AND search is employed in response to the selected first image being at a first distance from the selected at least one second image, and generates the query in which the OR search is employed in response to the selected first image being at a second distance from the selected at least one second image, the first distance being different from the second distance.

11. The user interface device according to claim 1, wherein the operation of changing the relative positional relationship includes an operation of rotating the selected at least one second image around the selected first image, and the generation unit determines the AND search or the OR search according to a direction in which the selected at least one second image is rotated.

12. The user interface device according to claim 1, wherein the generation unit generates the query in which the AND search is employed in response to the at least one second image being moved to approach the first image, and the generation unit generates the query in which the OR search is employed in response to the at least one second image being moved away from the first image.

\* \* \* \* \*